Figure 1:
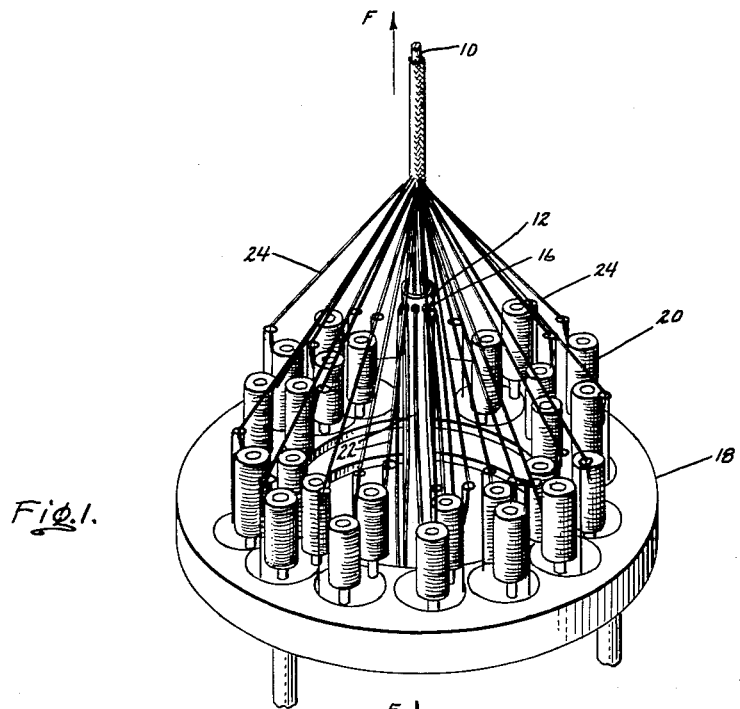

Inventor:
Samuel M. Shobert,
by Lust + Irish
Attorneys.

United States Patent Office 2,983,182
Patented May 9, 1961

2,983,182
APPARATUS FOR FABRICATING REINFORCED PLASTIC TUBING

Samuel M. Shobert, Mishawaka, Ind.
(P.O. Box 156, Walkerton, Ind.)

Filed July 17, 1957, Ser. No. 672,472

3 Claims. (Cl. 87—34)

The present invention relates to apparatus for fabricating reinforced plastic tubing, and more particularly to apparatus for fabricating tubing composed of tubular laminations.

In the art of fabricating glass-thread-reinforced plastic rods, methods and apparatuses are available for making the rod in either solid or tubular form. Meek Patent No. 2,684,318 discloses a method and apparatus for fabricating solid rod, while Francis Patent No. 2,602,766 discloses a method and apparatus for fabricating both solid and tubular rod.

Considering tubular rod only, the method of the Francis patent starts with a bundle of parallel-extending dry, glass threads into the center of which is inserted a rigid mandrel. A braid is then applied over the longitudinal threads for securing them in place. The composite bundle including the mandrel is placed in a mold and injected with liquid resin. The mold is heated and the resin cured for bonding all of the threads securely together. After curing, the mandrel is removed, leaving only the hollow rod.

While it is possible to fabricate tubular rod according to the method of the Francis patent as just described, certain disadvantages are present which render the same commercially unacceptable. For example, it is not possible to obtain a uniform circumferential distribution of the longitudinally extending threads around the mandrel by merely inserting the mandrel into a bundle or preform of dry threads. Invariably, there will be a greater number of threads on one side of the mandrel than on the other, and, in some instances, certain circumferential portions of the rod will have no threads whatsoever. Another disadvantage is found in the fact that the longitudinal threads are not extended axially, in other words, straight, but are loose and wrinkled. Since it is important in glass-reinforced plastic rods that the longitudinally extending threads be straight and under tension in order to obtain the necessary strength and flexural characteristics desired, loose and wrinkled longitudinal threads obviously cannot be tolerated. Even still further, the Francis method will not provide an equal distribution of longitudinal threads circumferentially of the rod whereby an even radial thickness of the lamination composed of the longitudinal threads may be obtained. There are other disadvantages which need not be elaborated here.

It is an object of this invention to provide an apparatus for fabricating a tubular rod in which the distribution of thread is uniform throughout the rod cross-section.

It is another object of this invention to provide apparatus for fabricating glass-thread-reinforced plastic tubing which simultaneously tensions the longitudinal threads and distributes them evenly circumferentially.

It is still another object of this invention to provide apparatus for fabricating tubing composed of two tubular laminations, the inner lamination comprising substantially straight, longitudinal threads distributed evenly circumferentially and the outer lamination comprising helically wound threads.

Other objects will become apparent as the description proceeds.

In accordance with this invention there is provided, in combination, a movable elongated mandrel, thread-distributing means disposed circumferentially of said mandrel, and braiding apparatus surrounding said mandrel and adapted to apply a braid of glass thread thereover.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 2:
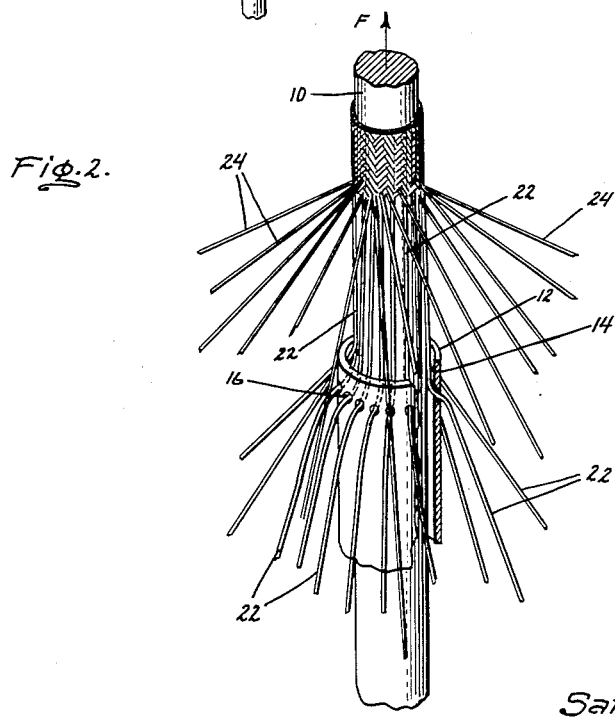

In the drawings:

Fig. 1 is a perspective illustration of one working embodiment of this invention; and Fig. 2 is a perspective illustration of a portion of Fig. 1 showing the tubular, thread-distributing member in part section.

Referring to the drawings, a mandrel 10, which determines the shape of the hollow portion of the finished rod, is disposed vertically and is movable axially upwardly. In the drawings, this mandrel is illustrated as being circular in cross-section; however, as will appear from the following description, it may have any desired cross-sectional shape depending upon the shape desired in the center of the finished rod.

Surrounding the mandrel 10 and fixedly secured relative thereto is a tubular member 12. This tubular member is coaxial with respect to the mandrel 10 and is radially spaced therefrom to provide a small annular clearance 14. The lower extremity of the tubular member or thread-distributing means 12 may be fixedly secured to a table top or suitable frame whereby the mandrel may be moved upwardly therethrough in the direction of the arrow F.

A plurality of circumferentially spaced, thread-receiving apertures 16 are provided in the upper end of the distributing member 12 as clearly shown in the drawings. The purpose of these apertures will be explained more fully in the following.

Surrounding the mandrel-tubular 10, 12 assembly is a braiding apparatus indicated generally by the reference numeral 18 in Fig. 1. This apparatus is of conventional design and carries a plurality of spools of glass thread 20 which revolve with respect to each other and around the mandrel for weaving a braid. The glass thread used as reinforcement in this invention for fabricating the tubing is that conventionally used in fabricating the so-called glass fishing poles and the like.

In operation, the mandrel 10 is inserted in the tubular member 12 and moved downwardly to its lowermost position. Glass thread, indicated generally by the reference numeral 22, is payed off a plurality of supply spools (not shown) and threaded through the respective apertures 16 of the tubular member 12 from the outside in. These threads 22 are drawn upwardly and laid on the mandrel 10 in straight, parallel relation, as illustrated in Fig. 2. These threads need to be drawn upwardly only three or four inches along the mandrel or just far enough so that a string or cord may be tied around the mandrel and threads for securing the thread ends in place.

Next, the threads 24 from the braiding apparatus 18 are drawn upwardly and fastened to the mandrel near the tie of the longitudinal threads and are also secured thereat by some suitable means such a cord tie. At this point, the braider 18 is started operating so as to apply continuously the usual braid of interwoven helical threads on the longitudinally extending threads 22. Of course, the mandrel 10 is at all times serving as a core or support around which this braiding operation takes place.

Simultaneously with the starting of this braiding operation, the mandrel 10 is slowly moved axially upwardly drawing the threads 22 through the apertues 16 and simultaneously applying the braid over these threads. By reason of the attritional resistance between the apertures 16 and the threads 22, the threads 22 on the mandrel are tensioned and maintained in substantially straight lines. Thus, the mandrel threads 22 are always evenly distributed around the circumference of the mandrel which provides a uniform radial thickness in the finished tubing as will now become apparent. The apertures 16 are made to such size as to afford suitable resistance to drawing the threads therethrough, whereby a straightening tension must be applied to the threads before they can be pulled through the apertures.

After the full length of the mandrel 10 has been moved upwardly through the tubular member 12, for example such mandrel may have a length of four or five feet, the braiding and pulling operations are stopped and the threads on the lower end of the mandrel are tied with a cord. The threads are then cut off and the mandrel assemblage is immersed in a bath of liquid resin. After impregnation, the resin is cured for bonding the threads securely together in a composite tubular form; following this, the mandrel 10 is removed, leaving only the tubular rod as the finished product.

The resin just mentioned is the same as that conventionally used in the fabrication of so-called glass fishing rods, and still further may be the same as that used in connection with the methods disclosed and claimed in Francis Patent No. 2,602,766 and Meek Patent No. 2,684,318.

What is claimed is:
1. In combination, an elongated mandrel floatingly positioned to be moved axially, a tubular member having opposite ends, said tubular member surrounding said mandrel and having a small annular clearance therewith, said clearance corresponding in size to a glass thread, said mandrel being movable relative to said tubular member, said tubular member having a plurality of circumferentially evenly spaced thread-receiving apertures therein for evenly distributing longitudinally extending glass threads about said mandrel, and a braiding apparatus surrounding said mandrel at a location spaced beyond one end of said tubular member, said apparatus being adapted to apply a braid of glass thread around said longitudinally extending threads.

2. In combination, an elongated mandrel floatingly positioned to be moved axially, a tubular member having opposite ends, said tubular member having a plurality of thread-receiving circumferentially evenly spaced apertures adjacent one end for evenly distributing longitudinally extending glass threads about said mandrel, said tubular member telescopically receiving said mandrel with a small annular clearance, and a braiding apparatus surrounding said mandrel at a location spaced beyond the other end thereof whereby a braid may be applied around said longitudinally extending threads.

3. In combination, an elongated mandrel floatingly positioned to be moved axially, a stationary device surrounding said mandrel and being disposed immediately adjacent thereto, said mandrel being movable with respect to said stationary device, a plurality of thread-guiding portions on said device which are evenly distributed circumferentially with respect to said mandrel, each thread-guiding portion having radially extending surfaces which are spaced apart a distance to engage frictionally a glass thread which is passed therebetween, said surfaces being spaced apart in directions both circumferential and axially with respect to said mandrel, means for initially securing the ends of a plurality of glass threads to said mandrel after said threads have been passed through said thread-guiding portions and axially aligned against said mandrel, and braiding apparatus surrounding said mandrel for applying a braid of glass thread on said aligned glass threads as said mandrel is moved axially.

References Cited in the file of this patent
UNITED STATES PATENTS

| | | |
|---|---|---|
| 424,575 | Reed | Apr. 1, 1890 |
| 734,508 | Buschner | July 28, 1903 |
| 1,093,915 | Cobb | Apr. 21, 1914 |
| 1,159,286 | Smith et al. | Nov. 2, 1915 |
| 1,210,001 | Randall | Dec. 26, 1916 |
| 1,907,744 | Craig | May 9, 1933 |
| 2,344,181 | Stone | Mar. 14, 1944 |
| 2,602,766 | Francis | July 8, 1952 |
| 2,816,595 | Hudak | Dec. 17, 1957 |